Oct. 24, 1967   F. J. CARSON ET AL   3,348,935
METHOD FOR BENDING GLASS SHEET TO A COMPLEX CURVATURE
Filed Aug. 11, 1955   8 Sheets-Sheet 1
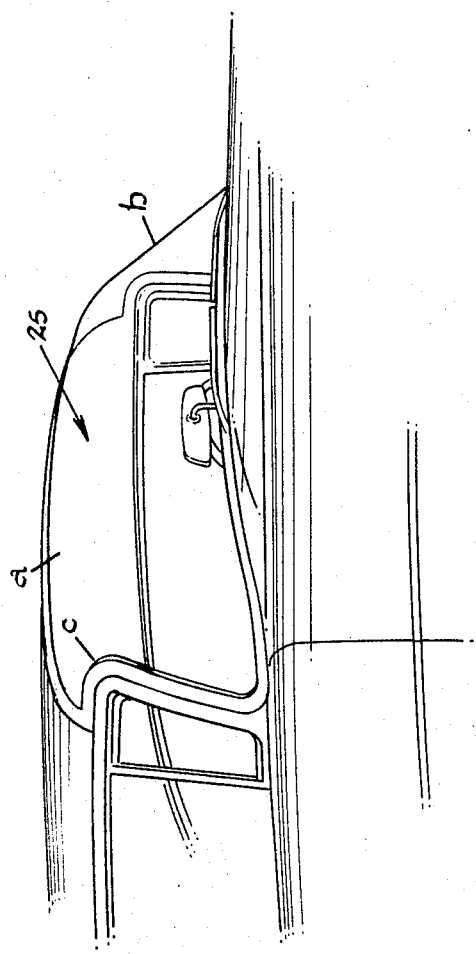
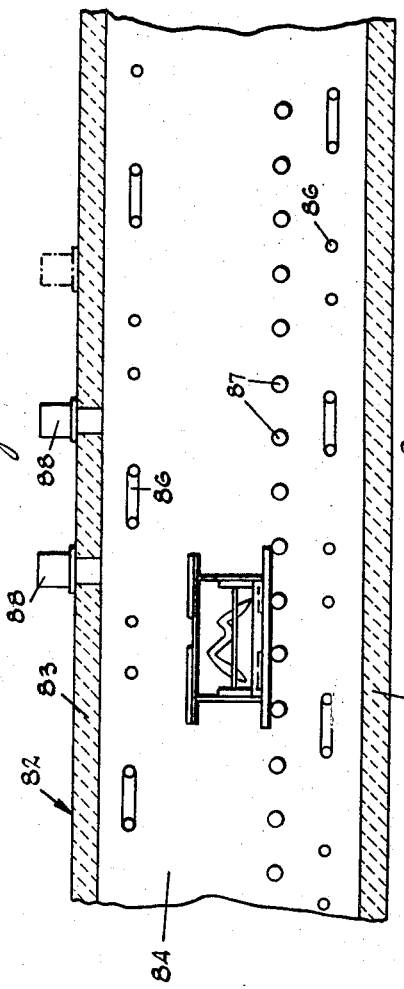
INVENTORS
Frank J. Carson and
Herbert A. Leflet, Jr.
Nobbe & Swope
ATTORNEYS

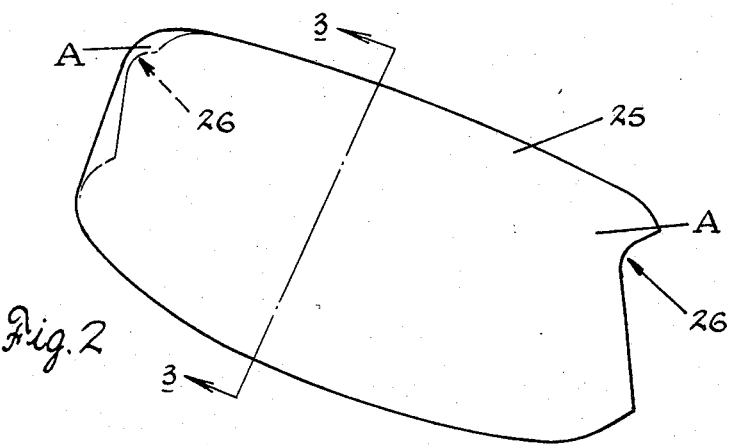
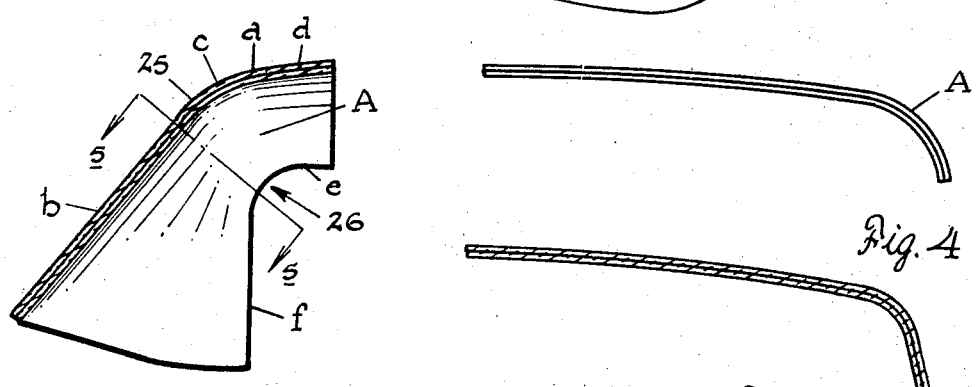

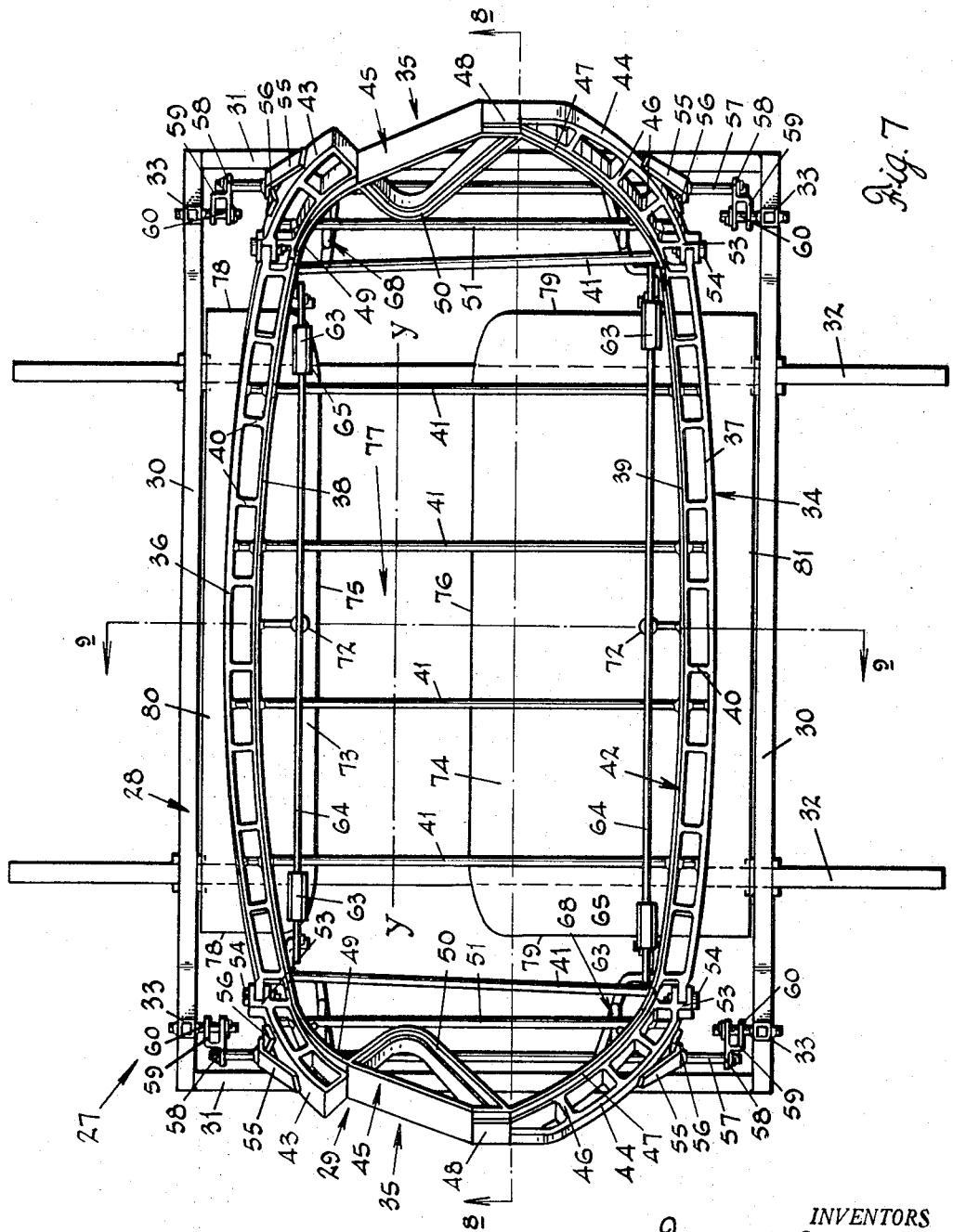

Oct. 24, 1967  F. J. CARSON ET AL  3,348,935
METHOD FOR BENDING GLASS SHEET TO A COMPLEX CURVATURE
Filed Aug. 11, 1955  8 Sheets-Sheet 4
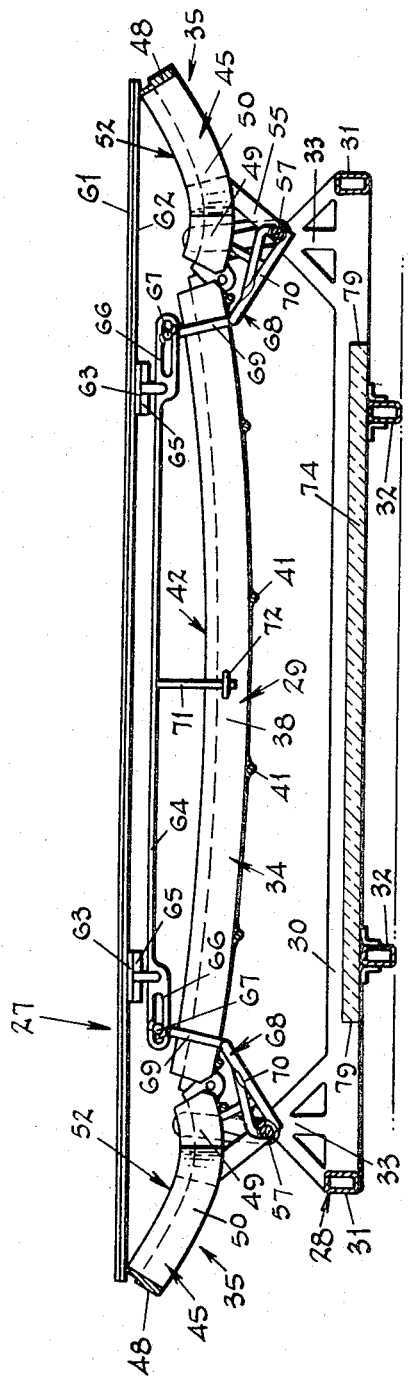
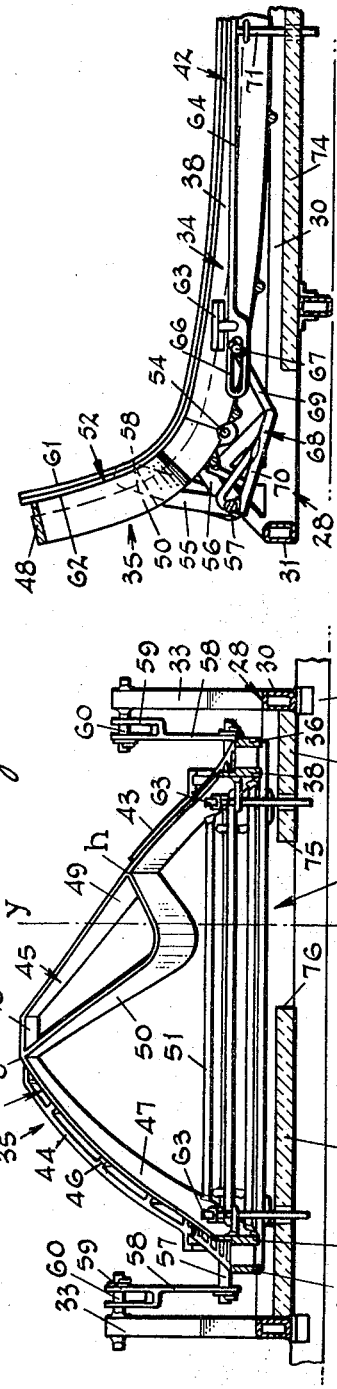
INVENTORS
Frank J. Carson and
Herbert A. Leflet, Jr.
Nobbe & Swope
ATTORNEYS

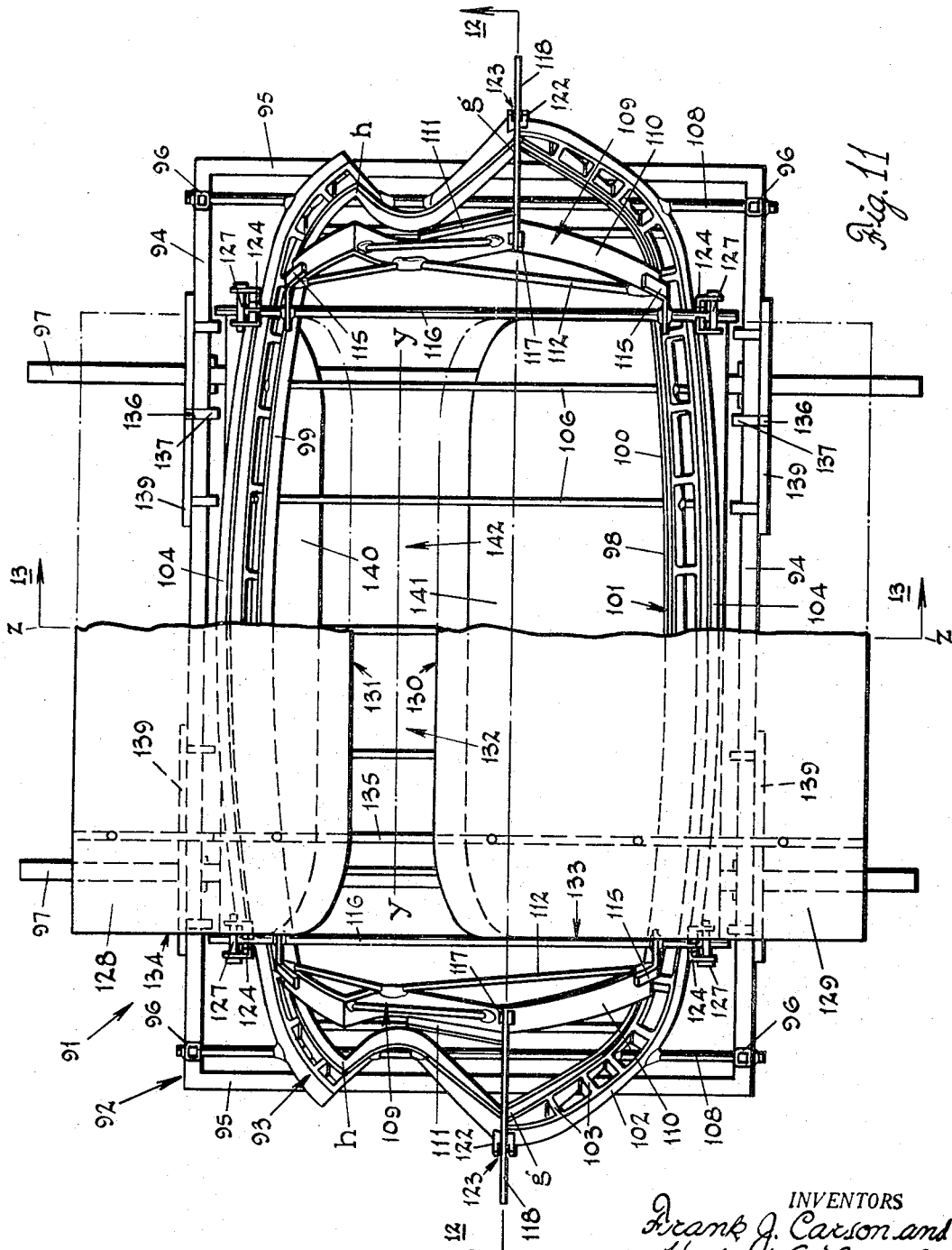

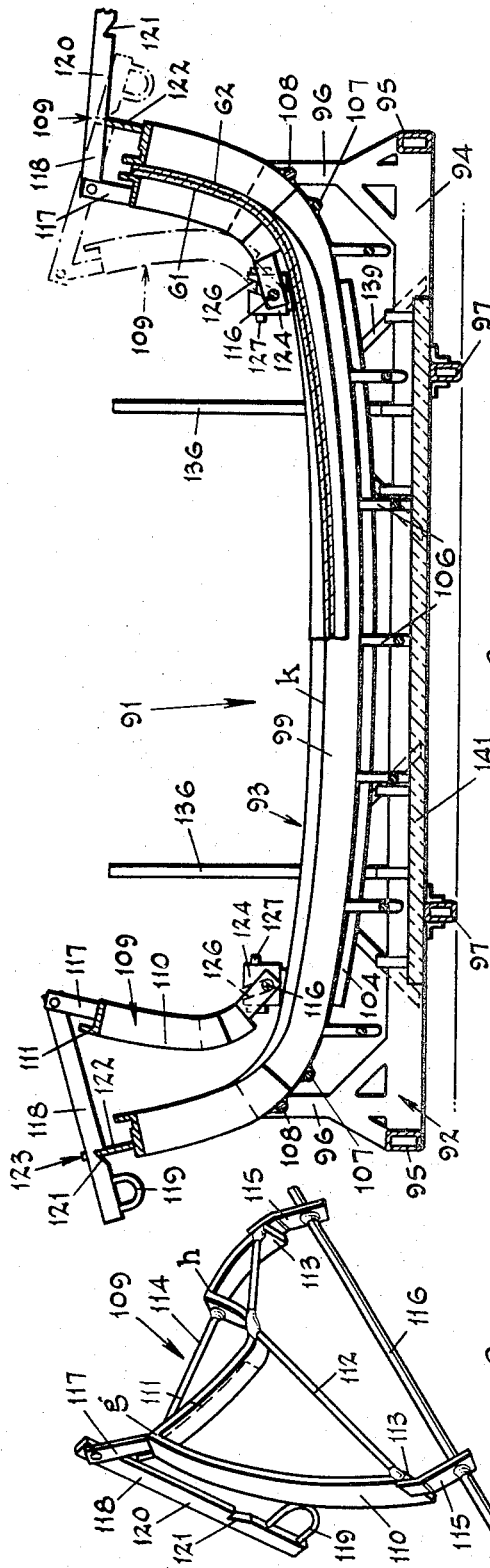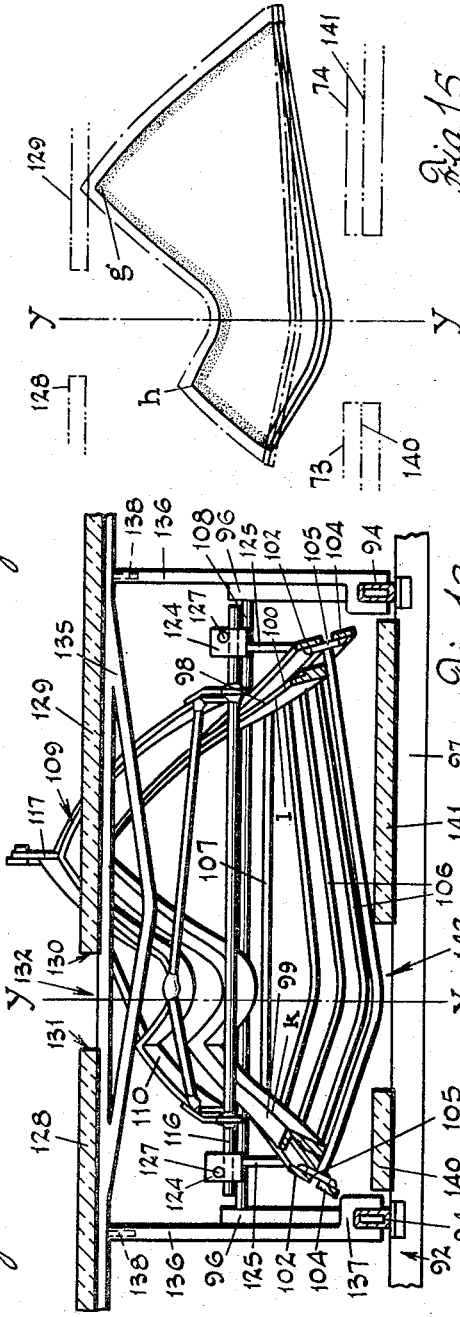

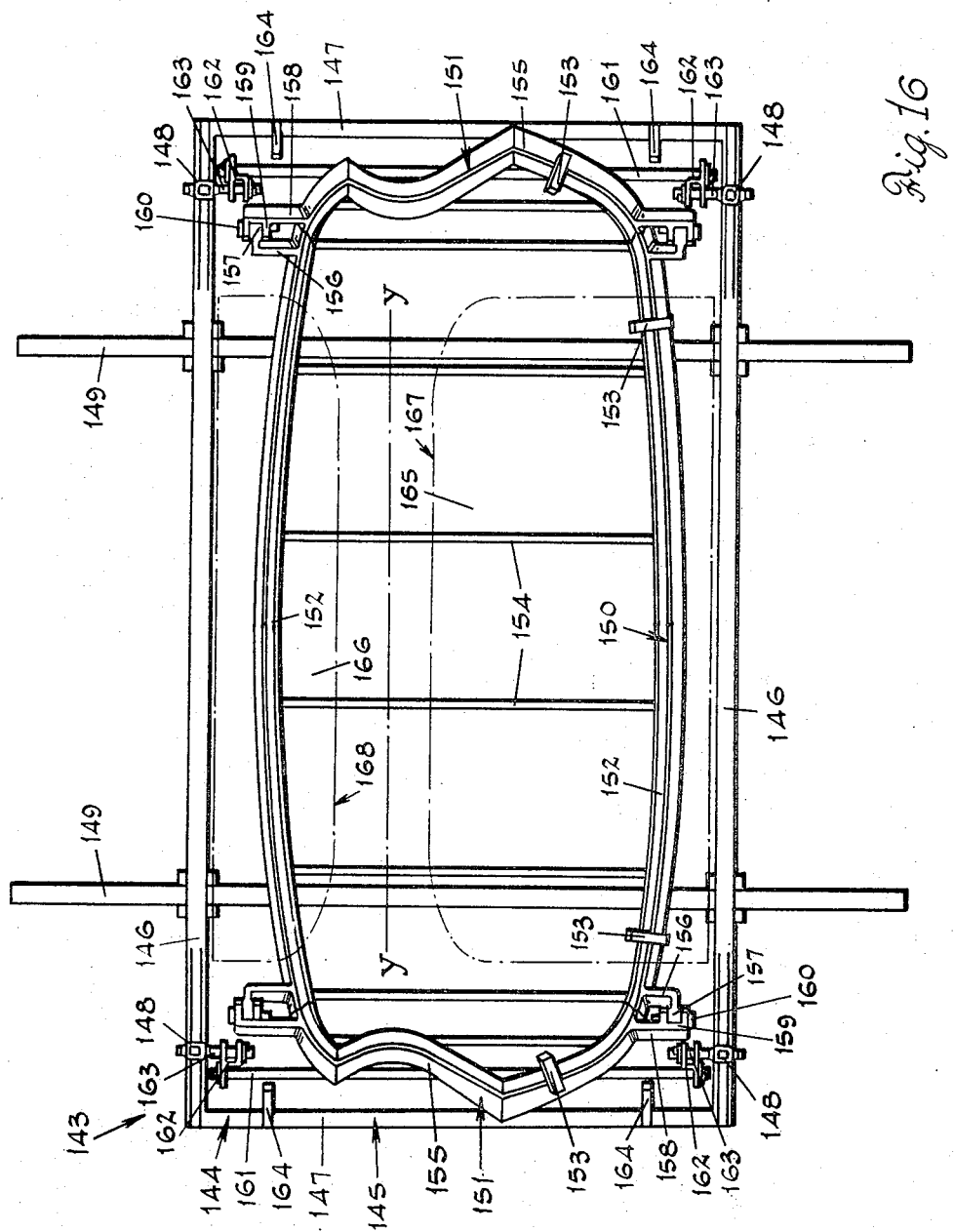

Oct. 24, 1967     F. J. CARSON ET AL     3,348,935
METHOD FOR BENDING GLASS SHEET TO A COMPLEX CURVATURE
Filed Aug. 11, 1955     8 Sheets-Sheet 8
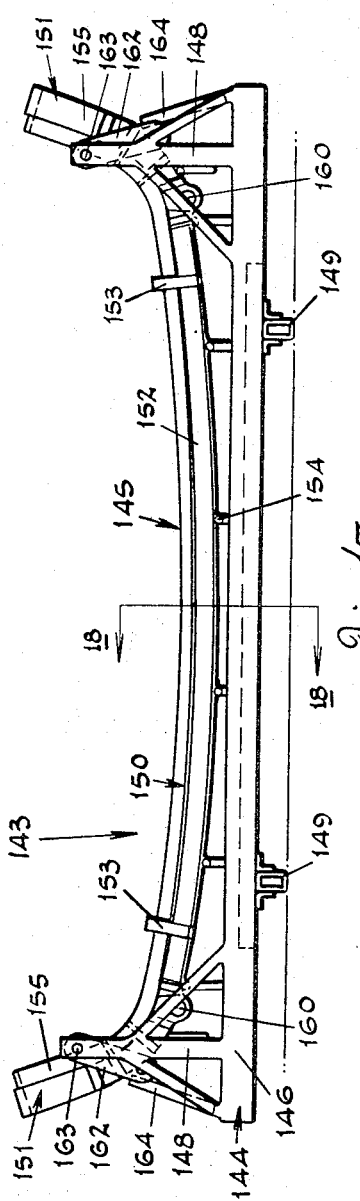
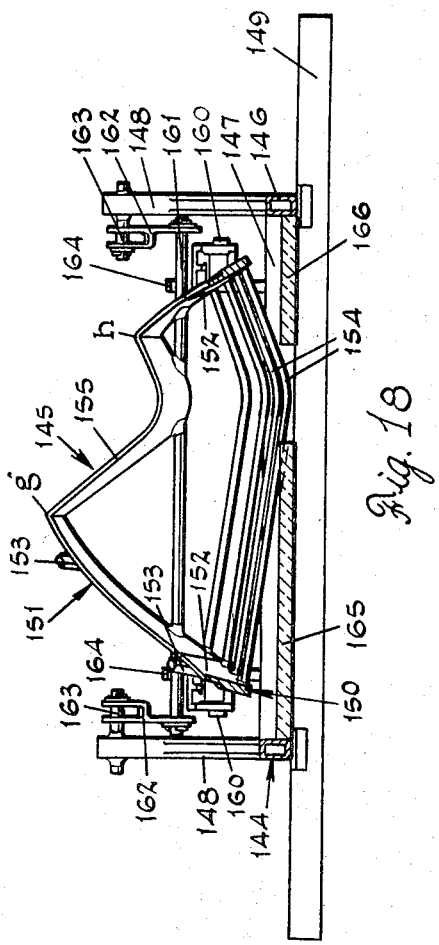
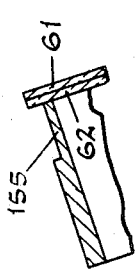
INVENTORS
Frank J. Carson and
Herbert A. Leflet, Jr.
Nobbe & Swope
ATTORNEYS United States Patent Office 3,348,935
Patented Oct. 24, 1967

3,348,935
METHOD FOR BENDING GLASS SHEET TO A COMPLEX CURVATURE
Frank J. Carson and Herbert A. Leflet, Jr., Toledo, Ohio, assignors to Libbey - Owens - Ford Glass Company, Toledo, Ohio, a corporation of Ohio
Filed Aug. 11, 1955, Ser. No. 527,726
8 Claims. (Cl. 65—103)

The present invention relates generally to the bending of glass sheets or plates, and more particularly to an improved method and apparatus for bending glass sheets to complexly curved shapes.

The wide-spread popularity of the panoramic or hook-type windshields has created a popular demand for greater visibility and increased viewing area in automobiles. Such a demand, especially where the windshied is involved, has necessitated increasing the viewing area or total glass surface of the windshield to such an extent that the curvature and shape of the same is becoming increasingly difficult to bend. This is especially true when the panoramic type windshields are extended upwardly and then swept back in a curve to meet the roof panel of the automobile to form what may be termed a "cap" windshield.

Such a windshield construction involves a bend about both major axes of the glass sheets used to form the windshield. The usual longitudinal bend about the transverse axis of the sheet is necessary to form the relatively sharply curved end sections, and a second bend about the longitudinal axis of the sheet is required to form the cap portion curvature.

In the past, the bending of glass sheets to panoramic shape has proved to be extremely difficult. With the addition of the curved portion at the top of the windshield, the difficulties encountered in bending the glass sheets have been almost insurmountable.

Therefore, an important object of the present invention is to provide an improved method and apparatus for bending glass sheets to complexly curved shapes.

Another object of the invention is to provide a method of bending a flat glass sheet to produce a bent sheet having a bend about both major axes of said sheet.

Another object of the invention is to provide an improved method of bending glass sheets which includes accelerating the heating of certain portions of the sheet while retarding the heating of other portions of the sheet.

Another object of the invention is to provide a method and apparatus for bending a glass sheet to a complexly curved shape in which the finally bent sheet is free from undesirable strain patterns which might be produced as a result of bending and has a toughened and hardened edge portion.

Another object of the invention is to provide a method and apparatus for bending glass sheets to complexly curved shapes in which the sheet is heated and has a first concavo-convex bend formed therein, cooled, and then reheated and bent to a second concavo-convex curvature.

Another object of the invention is to provide bending apparatus to properly bend a glass sheet into a complexly curved shape including a plurality of concavo-convex bends, comprising a plurality of bending molds each of which being adapted to form one of the concavo-convex bends.

A further object of the invention is to provide improved bending molds for forming concavo-convex bends in glass sheets.

A still further object of the invention is to provide a bending mold on which a pre-bent glass sheet may be supported and bent to a second curvature about an axis normal to the axis of the first bend.

A still further object of the invention is to provide means on such a bending mold to insure that the bent sheet, when again being bent, retains its overall initial curvature.

Other objects and advantages of the invention will become more apparent during the course of the following description when taken in connection with the accompanying drawings.

In the drawings, wherein like numerals are employed to designate like parts throughout the same:

FIG. 1 is a perspective view of a cap windshield when installed in an automobile;

FIG. 2 is a perspective view of the cap windshield from a different angle of sight;

FIG. 3 is a transverse section taken along the line 3—3 of FIG. 2;

FIG. 4 is a partial edge view taken along the line 4—4 of FIG. 3 and showing the end curvature of the upper portion of the windshield;

FIG. 5 is a fragmentary section taken along the line 5—5 of FIG. 3 and showing the end curvature of the lower portion of the windshield;

FIG. 6 is a plan view of one of the glass sheets used in forming the windshield after it has been bent to panoramic shape;

FIG. 7 is a plan view of the improved pre-bend hinged mold, when the mold is in the closed position, used in bending a glass sheet to its initial or panoramic curvature;

FIG. 8 is a vertical longitudinal section taken along the line 8—8 of FIG. 7 showing the mold in the open position and with a pair of flat glass sheets supported thereon prior to bending;

FIG. 9 is a transverse vertical section taken along the line 9—9 of FIG. 7;

FIG. 10 is a fragmentary end view of the bending mold shown in FIG. 8 when in the closed position;

FIG. 11 is a plan view of the improved bending mold for forming the final bend in a glass sheet that has previously been initially bent;

FIG. 12 is a vertical longitudinal section taken along the line 12—12 of FIG. 11;

FIG. 13 is a transverse section taken along the line 13—13 of FIG. 11;

FIG. 14 is a perspective view of a sheet pressing member associated with the mold of FIG. 11;

FIG. 15 is a transverse sectional view of a pair of glass sheets bent in accordance with the method and apparatus of the invention with the phantom lines showing the sheet after being bent on the mold of FIG. 7, and the full lines portraying the sheet after being bent on the mold of FIG. 11;

FIG. 16 is a plan view of a mold on which the completely bent sheet is supported and reheated to remove undesirable strain patterns;

FIG. 17 is a side elevation of the mold shown in FIG. 16;

FIG. 18 is a transverse vertical section taken along the line 18—18 of FIG. 17;

FIG. 19 is a fragmentary view showing the relative position of the edges of the glass sheets with respect to the shaping rail of the mold shown in FIG. 16; and FIG. 20 is a partial vertical longitudinal section of one type of bending furnace in which the glass sheets may be bent in accordance with the method of the invention.

Briefly stated, the present invention provides an improved method and apparatus for bending glass sheets to complex shapes including a plurality of concavo-convex bends which are smoothly blended into conformity with one another to provide an overall eye-pleasing appearance and which may be used, for example, in forming laminated windshields. According to the invention, a glass sheet, or pair of sheets, are first heated and bent into a concavo-convex curvature about one of the major sheet axes. The sheet is then cooled and cut to rough pattern outline, reheated, and bent to a substantially final curvature having a concavo-convex bend about the other major sheet axes. After being bent to final curvature, the sheet is cut to final pattern outline, reheated to remove any undesirable strain patterns produced during the bending operations, and to correct the sheet curvature if necessary, and then cooled in such a manner as to provide a compression band about the marginal periphery thereof.

With reference now to the drawings, FIGS. 1 to 6 show a modified panoramic or cap windshield 25 which may be produced in accordance with the method of the invention and by the improved bending apparatus herein disclosed. The windshield 25, best visualized in FIG. 1 and shown in sectional view in FIG. 3, is of a general panoramic shape but has a swept-back cap portion *a* which extends rearwardly from the front surface *b* of the windshield through a curved portion *c*, and then terminates in a substantially flat upper cap surface *d*. The upper surface *d* is substantially flat across the major portion of the windshield 25 and curves downwardly at each opposite end thereof to terminate at a side edge *e*, which is horizontal at its outer end and curves inwardly and down to meet the upper end of a lower rear edge portion *f* and defines a notch in the windshield indicated by the numeral 26.

As seen in FIG. 2, the top curved end portion A of the windshield immediately above the notched section 26 curves forwardly and downwardly to the side at the same time. It is readily visualized that such an end curvature, together with the cap portion *a*, is extremely difficult to produce in a glass sheet, having in mind the remaining portion of the windshield which is substantially panoramic in shape and which in itself has proved difficult to bend. However, the present invention provides a novel method and apparatus for properly bending a glass sheet, or sheets, into the complexly curved shape shown in FIGS. 1 to 6.

*Initial bending*

It was previously mentioned that in bending such a windshield the glass sheet is bent in several steps and into a plurality of concavo-convex bends. The initial bending of the glass sheet, or sheets, into a concavo-convex bend about the transverse axis *x—x* of the sheet (FIG. 6), is effected by a bending apparatus 27 shown in FIGS. 7 to 10 and which comprises a supporting rack 28 and a bending mold 29 carried thereby. The rack 28 is substantially rectangular in shape and comprises spaced longitudinal side rails 30 rigidly connected to one another at their opposite ends by end rails 31. As a means of guiding the rack through the glass bending furnace commonly used, a pair of transversely spaced guide rails 32 are secured to the underside of the side rails 30 and are received within guide flanges associated with the conveyor rolls used in most bending furnaces. To support the mold 29 upon the rack 28, an upright 33 is spaced slightly inwardly from each of the opposite ends of the side rails 30 and rigidly secured to the upper surface of said side rails.

The mold 29 is of the hinged outline type and comprises a center section 34, and opposite end sections 35 hingedly connected at their inner ends to the center section. As best seen in FIGS. 7 and 8, the center section 34 comprises spaced curved side bars 36 and 37, each having spaced inwardly therefrom shaping rail sections 38 and 39 which are secured to their respective side bars by a plurality of web members 40. To impart rigidity to the center section, a plurality of spaced transverse rods 41 are rigidly secured to the under surface of the center section shaping rails and side bars.

In plan view, each of the shaping rail sections 38 and 39 is curved inwardly to conform to the outline of the glass sheet shown in solid lines in FIG. 6. In elevation view, the upper edge of the center section shaping rails have a relatively shallow concave curvature which corresponds to the lower central curvature of the windshield 25. Each of the shaping rails 38 and 39 have their upper edges finished and inclined slightly inwardly from the vertical to form a shaping surface designated in its entirety by the numeral 42.

The mold end sections 35 are substantially identical in shape and each comprises a pair of curved spaced side bars 43 and 44 of somewhat similar shape which cooperate with one another to support inwardly thereof an end section shaping rail designated in its entirety by the numeral 45 and which is secured to the side bars by a plurality of web members 46.

As best seen in FIG. 9, the shaping rail 45 includes an inwardly and upwardly curved side rail 47 carried inwardly of and secured to the side bar 44. At its upper end, the side rail 47 is rigidly secured to one end of a relatively short end rail section 48 which has its opposite end secured to the upper end of a second curved side rail 49 supported along a portion of its lower end by the side bar 43. From the major apex *g* of the shaping rail 45, or joinder point of the side rail portion 47 with the end rail section 48, an intermediate rail section 50 extends downwardly a limited distance and then curves upwardly to join the side rail portion 49 intermediate the ends thereof and defines a minor apex *h* of the shaping rail. To stabilize and strengthen the end sections, a transverse rod 51 is rigidly secured to the undersides of the side bars 43 and 44 and also the undersurfaces of the side rail sections 47 and 49. The upper edge of each of the end section shaping rail portions 47 to 50 lie in substantially the same plane of curvature and are each finished to provide an end section shaping surface designated in its entirety by the numeral 52.

To connect the end mold sections 35 to the center section 34, the lower end of each of the side bars 43 and 44 is bifurcated to form a yoke 53 which receives therewithin the adjacent end of each of the center section side bars 36 and 37. Suitable axially aligned holes are provided in the yoke and bar ends to receive a pin 54 which acts as the pivot member and completes the hinged joint.

As a means of supporting the mold 29 for hinged movement from an open to a closed position and vice versa, the side bars 43 and 44 of each of the end sections 35 are provided with a pair of downwardly directed rigid bars 55 and 56 which converge and overlap one another at their lower ends. Axially aligned holes are formed in each of the bars 55 and 56 to fixedly receive therethrough a transverse support rod 57. The rod 57 extends outwardly beyond the mold side bars and has each of its opposite ends rotatably received in a swingable link 58 carried by an upright 33. Each of the links 58 has its upper end in the form of a yoke 59 which is provided with suitable holes to receive and be rotatably supported by a pin 60 rigidly secured to the upper end of the upright 33.

To support a flat glass sheet, or pair of sheets 61 and 62, above the mold 29 prior to and during the bending thereof, a plurality of support blocks 63 are provided which engage the under surface of the sheet 62 inwardly of the side edges and ends thereof. As seen in FIGS. 7 and 8, the blocks 63 are positioned two each upon a pair of rods 64 supported inwardly of and adjacent the center section rail portions 38 and 39. The blocks 63 are carried inwardly of the ends of the rods 64 in such a position as to engage the sheet 62 at approximately the end one-quarter points and are composed of Marinite (registered trademark) or other suitable heat-resistant material which will not mar hot glass. "Marinite" is a registered trademark of the Johns-Manville Company and is used by them to designate a specific lime silicate bonded porous refractory composition having over 50% silica and alumina, the other major ingredients of which are iron (as $Fe_2O_2$) and calcium oxide. A representative analysis of Marinite is substantially as follows:

|  | Percent |
|---|---|
| $SiO_2$ | 50.64 |
| Total iron (as $Fe_2O_2$) | 17.80 |
| $Al_2O_3$ | 6.28 |
| CaO | 10.77 |
| MgO | 4.86 |
| $Na_2O$ | 0.66 |
| $SO_3$ | 0.12 |
| Loss on ignition | 9.90 |
| Total | 101.03 |

Each of the blocks 63 is supported by a trough 65 secured to the rod 64 in such a manner as to afford pivotal movement of the block in a plane normal to the plane of the glass sheets to be bent.

Each of the opposite ends of the rods 64 are formed as oblong slots or rings 66 through each of which are received transverse pins 67 of actuating links 68. The transverse portion 67 of each of the links 68 is connected at its one end to a shank portion 69 which in turn is rigidly secured at its opposite end to a triangular base member 70 rigidly connected to the rotatable transverse support rod 57. Midway between the ends of the rods 64, there is provided a downwardly extending, vertically positioned guide rod 71 which is slidably received and guided in movement by a ring 72 secured to the inner vertical surface of each of the center section shaping rails 38 and 39.

For a purpose to be later described, a pair of transversely spaced shields 73 and 74 are carried by the guide rails 32 of the rack 28 in such a position as to shield selected portions of the lower surfaces of the glass sheets 61 and 62 from radiant heat directed upwardly from beneath the path of travel of the sheets through a bending furnace and also to withdraw heat from the furnace atmosphere adjacent the shielded sheet portions. As shown in FIGS. 7 and 8, each of the shields 73 and 74 is substantially rectangular in shape and both have their inner longitudinal edges 75 and 76 respectively spaced substantially equidistant from a center line y—y to define a gap 77 therebetween. The shields 73 and 74 may be formed of Marinite (registered trademark) or other suitable material having a specific heat greater than that of glass and which will not deteriorate at the furnace temperature used to bend glass.

The opposite end edges 78 of the shield 73 and the end edges 79 of the shield 74 are aligned with one another and are spaced inwardly from the hinged joints connecting the mold sections with one another. As will be noted from FIG. 7, each of the inner longitudinal edges 75 and 76 of the shields are curved outwardly at their opposite ends to meet their respective end edges 78 and 79, and the outer longitudinal edges 80 and 81 respectively are disposed outwardly of the center section side bars 36 and 37 respectively.

The furnace 82 shown in FIG. 20 illustrates one type of bending furnace which may be used in carrying out the method of the invention. The furnace, a partial longitudinal section only of which is shown, is tunnel-like in cross section and has a roof 83, upstanding side walls 84, and a bottom wall 85. To provide heat for the furnace interior, a plurality of radiant tubes 86 are provided which extend transversely across the furnace both above and below a conveyor 87 used to carry bending molds through the furnace. The radiant tubes not only serve to heat the furnace to elevated temperatures, but also direct radiant heat toward the conveyor 87 and thus toward the path of movement of the molds, bearing glass sheets to be bent, as they move through the furnace.

As an alternate source of heat which may be used if radiant tubes are not desirable, a plurality of roof burners 88 may be spaced over the path of movement of the molds, which burners direct radiant heat downwardly at the mold path of movement and also at the furnace bottom wall 85 which in turn re-radiates a certain amount of heat upwardly toward the bottom of the conveyor.

When it is desired to bend the pair of flat glass sheets 61 and 62 into conformity with the shaping surface of the mold 29, the mold sections are swung from the normal closed position of FIG. 7 to the open position of FIG. 8. In so opening the mold, the overall length thereof is increased and the links 58 accommodate such an increase by swinging outwardly on their support pins 60. As the mold sections move to the open or spread-apart position of FIG. 8, the transverse support rod 57 rotates in its supporting links 58 and the actuating links 68 rotate upwardly therewith to bring the upper surface of the blocks 63 into substantially the same horizontal plane as the upper surface of the end section shaping rail portions 48. The flat glass sheets 61 and 62 to be bent are then placed upon the mold and the ends of said sheets are supported by the end section shaping rail portions 48 while the end one-quarter points of said sheets are supported by the blocks 63. The weight of the sheets acting upon the outer ends of the mold end sections 35 then serves to retain the mold sections in the open spread-apart position.

The bending apparatus 27 having the glass sheets to be bent supported thereon is then passed through the furnace 82 and while therein is subjected to temperatures sufficient to cause the glass sheets to soften and sag downwardly into conformity with the mold shaping surface. When the sheets reach bending temperature, the hinged mold sections, which are held in the open position by the weight of the glass sheet, begin to close as the glass sheet softens and sags. In so doing, the inner ends of the mold end sections 35, adjacent the hinges, begin to move downwardly carrying the center section 34 of the mold with them. At the same time, due to the pivotal support of the end sections upon the rod 57, the outer ends of the end sections move upwardly and inwardly. In synchronous rotational movement with the end sections, the actuating links 68 begin to move downwardly and carry the rods 64 downwardly therewith. Due to the transverse portions 67 of the links having ample room to move transversely within the ring 66, the rods 64 are carried downwardly while maintained in a substantially horizontal position thus assuring equal coplanar support for the glass sheets by each of the blocks 63. Since the sheets are supported equally at four spaced points by the blocks 63, the downward movement thereof is effected in smooth non-tilting fashion.

To further maintain the blocks 63 in stable coplanar position, the downward movement of each of the rods 64 is controlled, as far as stability is concerned, by the vertical rod 71 restrainedly moving vertically downward within the ring 72. Since the actuating links 68 are rigidly secured to the rod 57 for rotational movement therewith, the blocks 63 continue to support the under surface of the glass sheets during their entire downward movement and until the center section of the sheet sags into conformity with the shaping surface 42 of the mold center section 34. At that time, the end sections 35 of the mold have practically closed and their small remaining increment of movement folds the opposite ends of the glass sheets upwardly and inwardly at which time the blocks 63 are drawn beneath the center section shaping surface and the glass sheets conform to the shaping surfaces 52 of the mold end sections.

It is well known in the glass bending art that when a glass sheet is bent upon a concave mold, such as the mold 29, the central portion of the sheet inwardly of the mold shaping surface sags downwardly a limited distance. To control the amount of sag and properly position the longitudinal line of greatest sag with respect to the longitudinal sheet edges, the shields 73 and 74 are transversely spaced from one another to locate the gap 77 therebetween beneath the longitudinal area of the sheets which defines the cap curvature $a$.

It was previously mentioned that the shields 73 and 74 had their inner adjacent longitudinal edges spaced an equal distance from the line $y$—$y$ (FIG. 7). Upon reference to FIG. 15, it will be seen that the line $y$—$y$, intersects the surfaces of the glass sheets at the point of maximum desired transverse curvature of cap portion $a$ of the windshield 25. Therefore, when the mold is passed through the furnace 82, the upper surfaces of the glass sheets are completely exposed to radiant heat directed downwardly toward the path of the molds through the furnace whereas the bottom surfaces of the sheets are shielded from radiant heat, directed upwardly toward their path of movement, in portions designated by the shaded areas 89 and 90 in FIG. 6 wherein the area 89 defines the area of the sheets shaded by the shield 73 and the area 90 covers the area shaded by the shield 74.

However, the shields serve another purpose which may, in fact, be more important than their shielding action especially in a furnace only having heat sources above the path of travel of the glass sheets. Since the shields are composed of a material having a higher specific heat than that of the glass sheet, it takes a greater amount of heat to raise the temperature of the shields the same number of degrees Fahrenheit as compared to glass. Therefore, where portions of the glass sheets 61 and 62 are closely adjacent to the shields, those portions do not become as highly heated as portions remote from the shields since the shields withdraw heat from the atmosphere adjacent thereto.

It will be understood of course that if the shields were made of a material having a lower specific heat than glass, the shields would heat more rapidly than the glass and therefore add heat to the portions of the glass sheet immediately adjacent thereto.

Thus, in passing through the bending furnace the longitudinal areas of the glass sheets immediately above the shield gap 77 plus the end portions of the sheets outwardly of the shaded areas 89 and 90 are exposed to radiant heat both from above and below their path of movement through the furnace. This excess of radiant heat causes those portions of the sheet thus exposed to radiant heat to become softer than the shaded areas 89 and 90 which have the heating thereof retarded and therefore the sheet readily bends to concavo-convex outline shown in phantom lines in FIG. 15.

When finally bent to initial or panoramic shape, the opposite end portions of the sheets, corresponding to the notched portions 26 of FIG. 3, are then cut along the outermost phantom line $i$ and the sheets are then ready for the final bending operation in which the cap portion curvature $a$ of the windshield is completely formed.

Final bending

For final bending, the bent sheets 61 and 62, which are bent to a substantially final curvature about their transverse axis $x$—$x$ and have a partial bend about the longitudinal axis, are reheated and bent to the curvature shown in FIG. 15 in solid lines.

To effect final bending, a bending apparatus 91, shown in FIGS. 11 to 14, is used. The apparatus 91 comprises a rack 92 and a bending mold 93 of the fixed outline type. The rack 92 is substantially rectangular in shape and comprises spaced longitudinal side rails 94 rigidly joined to one another at their opposite ends by end rails 95. To support the mold 93, a vertical upright 96 is spaced inwardly a limited distance from each of the opposite ends of the side rails 94 and is rigidly secured to the upper surface of said rails. As a means of guiding the bending apparatus 91 through the type of bending furnaces commonly used, a pair of spaced runners or guide rails 97 are secured to the undersides of the side rails 94, which guide rails engage flanges provided on the rollers commonly used as a conveyor within most glass bending furnaces.

The mold 93 is of the type commonly termed a one-piece ring, or outline type mold, and is substantially symmetrical on each side of the transverse line $z$—$z$ shown in FIG. 11. For convenience of description, only the construction of the mold to the right of the line $z$—$z$ will be described in detail. In general, the mold 93 comprises a shaping rail upon which a glass sheet may be bent, and a suitable framework for supporting the shaping rail. In the central portion of the mold, the shaping rail designated in its entirety by the numeral 98 is of shallow curvature, in a vertical plane, and outwardly of the central portion rises in a relatively sharp curve at each end to provide a curvature substantially in accord with the curvature of the bent glass sheets 61 and 62 which are to be further bent on the mold 93 after they have been initially bent by the mold 29. Referring now to FIGS. 11 and 13, the portion of the shaping rail 98 to the left of FIG. 13, or the top of FIG. 11, will be referred to as the front section 99, and the shaping rail portion to the right of FIG. 13, or the bottom of FIG. 11, will be referred to as the rear section 100. The upper surfaces of each of the rail portions are finished to provide a shaping surface designated in its entirety by the numeral 101.

The front rail section 99, in the central portion of shallow curvature, is of substantial width as compared to the rear rail section 100, and has its upper surface inclined downwardly at an angle with the horizontal. As later described in detail, the width of the front rail section and the inclination thereof is for the purpose of allowing the lower edge of a pair of glass sheets to properly move thereover during bending.

As the front section 99 of the shaping rail 98 is extended outwardly toward the end thereof, the upper surface is inclined downwardly and more toward the vertical; that is, with each successive increment of length of the section toward the ends of the mold, the plane of the upper surface approaches the vertical. This is for the purpose of constantly keeping the upper surface of the rail at an angle, as compared to the lower edge of a pair of glass sheets which move thereover during bending. From a comparison in plan view of the rail section 99 of FIG. 11 with the outline of the glass sheet shown in FIG. 6, it will be seen that the rail portion 99 corresponds in curvature to the outline of the glass sheet, or sheets, to be bent. As the front portion 99 of the shaping rail 98 begins its upward curvature to approach the minor apex $h$ of the glass sheet, it will be noted from FIG. 11 that the angle of the surface of the rail with the vertical decreases and is at a minimum at the minor apex. As the rail dips downwardly to conform to the notched portion 26 of the sheet, the angle of the top surface of the rail, with respect to the vertical, increases and at the bottom point of curvature, between the major and minor apices, is substantially the same as the angle of the rail surface in the central portion of relatively shallow curvature.

As the shaping rail again extends upwardly toward the major apex $g$, the angle of the upper surface thereof with the vertical again increases until at the major apex, the angle of the upper surface with the vertical is at a maximum. At the apex $g$ (FIG. 13), the inner upper edge $k$ of the rail section 99, which in the central portion of the rail is in a plane substantially normal to the bottom surfaces of the glass sheets, is now disposed in a plane substantially parallel thereto and bears against the under surface of the glass sheet being bent.

As seen in FIG. 13, in the portion of shallow curvature, the rear rail section 100 is much narrower in width, when compared to the rail 99, as far as the upper surface thereof is concerned. As the rear section is extended outwardly toward the end of the mold, the upper surface $l$ thereof which, in the portion of shallow curvature is in a plane substantially parallel to the under surface of the glass sheet and at a slight downward angle from the horizontal, has the angle of the upper surface with the horizontal continuously increased as the rail section is extended upwardly at the relatively sharply curved end until, at the major apex $g$, where the front and rear sections of the rail 98 are joined, the angle of the upper surface of the rail 100 with the horizontal and with the vertical equals that of the front rail section 99 at its end extremity or point of joinder with the rear section 100. It will be understood, therefore, that the rear shaping rail section 100 has the upper surface thereof disposed at a constantly varying angle in the end regions thereof which angle maintains the plane of the upper surface of the rail parallel to and bearing against the corresponding portion of the undersurface of the glass sheet, or pair of sheets, supported thereo.

On the other hand, the front section 99 of the shaping rail has its upper surface maintained at an angle which reverses on either side of the minor apex $h$ to cause even movement of the corresponding portions of the glass sheet thereover to assure proper sliding contact therewith so that the sheet may be properly bent.

To support the shaping rail 98, a substantially coextensive support bar 102 is provided which is spaced outwardly from the rail and supports the same by means of a plurality of web members 103 rigidly secured to both the shaping rail and the support bar. At the end portions of the mold, the continuous bar 102 approaches closer to the shaping rail 98 until at the major and minor apices $g$ and $h$, the bar is joined to and forms an integral portion of the rail.

Since the support bar 102, in the central portion of the mold spans a considerable distance and therefore would have an excessive deflection when heated, an auxiliary support member 104 is spaced downwardly therefrom and rigidly secured to the support bar by means of vertical struts 105 to form a girder section. As seen in FIG. 12, the member 104 extends substantially across the central portion of the mold and therfore provides increased rigidity for the portions of the support bar 102 which would be subjected to the greater stress and deflection.

To impart transverse rigidity to the mold, a plurality of bent rods 106 extend transversely across the mold and are secured to the undersides of the front end rear rail sections 99 and 100 and extend outwardly thereof to be rigidly joined to the girder struts 105. As viewed in FIG. 13, the rods 106 are bent in a vertical plane to clear the lower surface of the glass sheets. In the mold end portions, straight rods 107 are provided as transverse stiffening members and are secured to both the shaping rail and the support bar 102 wherever advantageous.

To support the mold 93 above the rack 92, a transverse support rod 108 is secured to each end of the mold, in transverse alignment with the uprights 96. The rods 108 are secured to the undersurfaces of the shaping rail 98 and support bar 102 at a plurality of points and extend outwardly therefrom to have each of their opposite ends rigidly fastened to one of the uprights 96.

As will be later set forth in more detail, it has been found desirable at one point in the bending operation to exert downward pressure on the upper surface of the glass sheets in the sharply curved end portions of the mold. For this purpose, a movable press member designated in its entirety by the numeral 109 is provided at each end of the mold. As seen in FIG. 14, the press member 109 comprises a shaping rail 110 which is curved to match the similarly curved shaping rail 98, at the end sections of the mold, and has its lower surface properly contoured to present a plane parallel to the upper surface of the glass sheets when supported on the mold. On the downward slope of the rail 110 from the major apex $g$ toward the minor apex $h$, there is provided an outwardly directed bar 111 which, when the rail 110 engages the glass sheets, is in a plane substantially parallel to the corresponding portion of the rail 99 and exerts pressure on the glass sheets therebetween. The rail 110 is suitably braced by tie rods 112 extending upwardly from the opposite rail ends 113 to meet with one another at the point of curvature of the rail which matches the notched sheet portion 26 shown in FIG. 6. To provide increased rigidity, a second tie rod 114 extends between rail points corresponding to the major and minor apices $g$ and $h$. At each of the lower rail ends 113, there is secured a bent strap 115 each of which is provided with a hole which matches and is aligned with the hole provided in the other strap and through which is fixedly received a transverse support bar 116.

At the major apex $g$ of the rail 110 and extending outwardly therefrom, there is provided a rigid bar 117 at the outer end of which is pivotally secured a locking and positioning arm 118. At its end opposite the point of joinder with the rigid bar 117, the arm 118 is provided with a downwardly depending U-shaped hand grip 119. Spaced inwardly from the hand grip and on the shank 120 of the arm, there is formed a triangular notch 121, which notch is provided for the purpose of engaging a lock bar 122 having a V-shaped groove 123 provided at its outer end and having its opposite end secured to the support bar 102 adjacent the major apex $g$.

To support each press member 109 in proper position above its corresponding mold end section, a base block 124 is provided to rotatably restrain each end of the transverse support rod 116. The base block is supported above the mold shaping rail by means of a vertical strut 125 extending downwardly from the underside thereof and secured to the support bar 101. To receive and rotatably support the rod 116, the block 124 is provided with a slot 126 in which the rod end fits. A pin 127 is passed through the block 124 in transverse relation to the rod to removably secure the press member to the mold.

As will be later set forth in more detailed form, at the proper time in the bending operation, the handle 118 will be disengaged from the member 122 and the pressing member will be lowered to the position shown to the right of FIG. 12 and bear against the surface of the uppermost glass sheet on the mold.

It will be understood of course that not only a complexly curved shaping rail must be provided to properly aid in forming the cap portion curvature of the windshield, but also an accurate control of the exposure of the glass sheet to radiant heat while within the bending furnace must be obtained in order to properly soften those portions of the sheet that are to be additionally bent. It will also be understood that portions of the sheet which are exposed to direct radiation from the heat sources provided in most bending furnaces will become hotter and thus more adapted to bending than those portions of the sheet which are not thus exposed to direct radiation.

To accurately control the exposure of the glass sheets to radiant heat during bending, there is associated with the mold a plurality of shieds. The shields are preferably composed of Marinite (registered trademark), or other suitable material having a higher specific heat than glass, and shade selected portions of the glass sheet, or sheets, from radiant heat and at the same time, certain of the shields withdraw heat from the furnace atmosphere adjacent the shaded portions of the glass sheet.

As shown in FIG. 11, an upper shield 128 is provided which is spaced above and extends longitudinally of the mold from the point on the rear shaping rail section 100, where said rail begins to curve upwardly to define the end portions or portions of relatively sharp curvature of the glass sheet, to the opposite corresponding point at the other end of the rail portion 100. The opposite upper shield 129 extends longitudinally substantially the same distance and has its inner longitudinal edge 130 spaced from the corresponding inner edge 131 of the shield 128 to provide a gap 132 the size and location of which is carefully determined to provide for just the right area of exposure of the glass sheets to radiant heat passing downwardly from the roof of the bending furnace and/or sources of heat located therein. Each of the upper shields 128 and 129 has its inner longitudinal edge curved outwardly at the ends thereof to meet their respective aligned side edges 133 and 134, and each shield extends transversely of the mold a sufficient distance to shade the adjacent longitudinal edges of the initially bent glass sheets when positioned on the mold shaping surface. The upper shields are supported by means of a pair of transversely spaced triangular bar sections 135 extending thereunder which are suitably supported inwardly of their opposite ends by vertical rods 136 which have their lower ends 137 bifurcated to slip over and be restrained by the side rails 94 of the rack 92. Each of the rods 136 is hollow, and the sections 135 are removably held in place thereon by means of dowels 138.

As shown in FIGS. 11 and 12, stabilizing diagonals 139 extend downwardly from each of the vertical rods 136 and are provided with bifurcated or yoke portions at their lower ends which fit over the side rails 94.

To provide for accurate radiant heat concentrations upon the lower surfaces of the glass sheets and to retard the heating of selected portions thereof, when supported on the mold, bottom shields 140 and 141 are provided. As seen in FIG. 11, the bottom shield 140 is substantially coextensive in length with its corresponding shield 128 but is of lesser width and extends inwardly toward the central portion of the mold a lesser distance than the upper shield 128. Similarly, the opposite lower shield 141 is also substantially coextensive in length with its corresponding upper shield 129 but is also of lesser width and extends inwardly toward the central portion a lesser distance so as to provide a gap 142 between the lower shields of greater width, although of substantially the same length, as the gap 132 provided between the upper shields.

It will be noted from FIG. 13 that the center line of each of the shield gaps 132 and 142 lies in substantially the same vertical plane, as indicated by the line y—y, and thus the centroid of radiant heat patterns passing through the shield gaps from both above and below the path of the mold of the bending furnace are concentrated on the sheet surfaces over substantially the same general area. However, due to the placing of the shields, a greater area on the lower surfaces of the glass sheets is exposed to the action of radiant heat which may be directed upwardly thereagainst.

Before placing the glass sheets 61 and 62 to be additionally bent upon the mold 93, it is necessary to remove the upper shields 128 and 129, their transverse support sections 135, and also the press members 109 provided at the opposite ends of the mold. The glass sheets 61 and 62, which are of cross-sectional shape as shown by the phantom lines in FIG. 15, are then placed upon the shaping rail 98. After having located the sheets, the press members 109 are placed on the mold and located in the position indicated by the phantom lines to the right in FIG. 12. The upper shields 128 and 129 are then replaced above the sheets in the positions shown in FIG. 13.

With the various shields in proper position and the press members in the open position of FIG. 12, the bending apparatus is passed through a bending furnace, such as the furnace 82, wherein it is normally subjected to increasing zones of higher temperature until the sheet reaches the zone of the furnace commonly termed the bending zone wherein the heat is maintained at a temperature sufficient to effect softening of the glass sheets. As the overall temperature of the glass sheet increases, the surface portions thereof between the shield gaps 132 and 142 reaches a higher temperature due to exposure to radiant heat while at the same time the areas of the sheet shaded by the shields have the heating thereof retarded. It was previously mentioned that the sources of radiant heat in a bending furnace are normally located either adjacent the roof or the bottom wall of the furnace or adjacent both. As the mold in passing through the furnace moves past these sources of radiant heat, the surface portions of the sheet not shielded therefrom are exposed to direct radiation from the heat sources. Therefore, these portions reach a higher temperature than the remaining shaded portions of the sheet.

With reference now to FIG. 15, the shields 73 and 74 of the mold 29 are shown in phantom lines and positioned transversely with respect to the line y—y. Immediately below, the shields 140 and 141 of the mold 93 are also shown in phantom lines and positioned transversely with respect to the line y—y. It will be noted that the inner longitudinal edge of the shield 73 is positioned in substantially the same vertical plane as the corresponding edge of the shield 140. Similarly, the inner longitudinal edge of the shield 74 is located in substantially the same vertical plane as the corresponding inner edge of the shield 141. With the corresponding lower shields of each of the molds 29 and 93 thus positioned, it will be readily understandable that the same area on the lower surfaces of the glass sheets is exposed to radiant heat in both the initial bending stage and also the final bending stage. At the same time, the same areas on the surfaces of the sheets as defined by the shaded areas 89 and 90 (FIG. 6) have the heating thereof retarded in both the initial and final bending stages by the heat withdrawing action of the shields 73 and 74 and 140 and 141. This heating of certain portions of the glass sheets in combination with the retarding of the heating of other portions of the sheets insures the proper location and formation of the area of maximum transverse curvature in the bent sheets which area corresponds to the cap curvature $a$ of the windshield 25.

The upper shields 128 and 129 of the mold 93 are positioned relatively closer together and, as seen in FIG. 15, also have their inner longitudinal edges spaced substantially symmetrically about the line y—y. Thus, the radiant heat passing through the gap 132 therebetween is concentrated on the glass sheets therebeneath over substantially the same area on the upper surfaces of the sheet as the heat from below strikes the lower surfaces of the sheet. The heat from above, therefore, serves to additionally soften the glass sheets in the area requiring the severest bend. However, due to their distance from the glass sheets, the upper shields do not have a noticeably significant effect on the glass as far as retarding the heating of the same by withdrawing heat from the atmosphere. Their important function is to shield the portions of the sheet defined substantially by the areas 89 and 90 from radiant heat directed downwardly against the glass sheets.

Since the longitudinal area of the sheet immediately on either side of the line y—y reaches a higher temperature, the glass in this area sags downwardly. To accommodate the sag, which includes a shortening of width of the glass sheets in a horizontal plane, the edge of the lower sheet resting on the inclined surface of the shaping rail 99 section moves downwardly thereover, the movement of the sheet being facilitated by the downward inclination of the rail surface. At the same time, the portion of the sheet resting on the rear section 100 of the shaping rail remains in substantially the same position, as regards transverse movement, and virtually all of the sheet edge movement takes place by the edge portion supported by the rail section 99.

Since over exposure of the sheet to radiant heat would cause too deep a bend about the longitudinal axis thereof, the time of passage of the mold through the bending furnace is carefully controlled, thus insuring a bend of the proper depth. In bending to the transverse concavo-convex curvature shown in FIG. 15, the relatively sharply curved end portions of the sheets, even though exposed to radiant heat on both the upper and lower surfaces, are not always in proper registry with the corresponding portions of the mold shaping surface. Therefore, after the transverse cap curvature of the sheet is formed and before the mold leaves the bending zone of the furnace, a furnace operator disengages the arm 118 of the press member 109 from the bar 122, and the shaping rail 110 of the press member is lowered into contact with the upper surface of the glass sheets. A slight amount of pulling pressure on the handle will then properly bring the end portions of the sheets into proper registry with the end section shaping surface.

After passing through the furnace bending zone, the bending apparatus bearing the now bend sheets is passed into an annealing zone commonly associated with and providing a continuation of the bending furnace. In passing through the annealing zone, the temperature of the glass sheet is slowly reduced so as to avoid, as far as possible, undesirable strains forming in the sheets. After the annealing step, final pattern-cut sheets are cut from the sheets 61 and 62 along the phantom line $m$ shown in FIG. 6.

After being pattern cut to final outline, the bent glass sheets 61 and 62, if desired, may be laminated on each side of a plastic interlayer to provide a finished windshield. However, the relatively large metallic areas of the mold 93, particularly the press members 109, produce certain areas of strain in the glass sheets which may be considered undesirable. Therefore, it is preferred to reheat and then cool the bent glass sheets to remove these undesirable strain patterns and also to form a compression area about the marginal periphery of the glass sheets to better enable said sheets to resist edge stresses and loads.

*Strain relieving*

To support the glass sheet during the reheating step, there is provided a bending apparatus 143, shown in FIGS. 16 to 19, comprising a rack 144 and a bending mold 145 supported above the rack.

The rack 144 is substantially rectangular in shape and comprises spaced parallel side rails 146 rigidly joined together at their opposite ends by end rails 147. Spaced inwardly from each of the opposite ends of the side rails 146 there is provided an upright 148 rigidly secured to the upper surface of said rails and which, as later described, serves to support the bending mold 145. To provide a guide for the rack through the conventional bending furnaces used in bending glass sheets, a pair of guide rails 149 are secured to the undersurface of the side rails 146 and spaced inwardly from the opposite ends thereof.

The bending mold 145 is of the type commonly termed a hinged outline mold and comprises a center section 150 hingedly joined at each end to oppositely disposed end sections 151. The center section 150 comprises a pair of spaced curved shaping rails 152 contoured in such a manner as to substantially conform to the curvature of the bent sheets 61 and 62, which are retained in place thereon by suitable locator bars 153 secured to said shaping rails. As seen in FIG. 19, the shaping rail 152 engages the glass sheets inwardly of the edges thereof and is angled inwardly from the vertical so that the upper surface thereof evenly supports the underside of the glass sheet 61. To join the opposite shaping rails 152 together in forming a rigid structure, a plurality of cross ties 154 are provided and bent downwardly intermediate their ends to afford proper clearance for the bent glass sheets when supported on the mold.

The mold end sections 151 comprise a shaping rail 155 contoured similarly to the end section rails provided in the molds 29 and 93 so as to properly match the curvature of end portions of the glass sheets although spaced inwardly of the edges thereof. As seen in FIG. 18, the shaping rail 155 is contoured to provide major and minor apieces $g$ and $h$ which correspond to the apieces $g$ and $h$ formed in the end section shaping rails in the molds 29 and 93. As was the case with the molds 29 and 93, the upper edge of the shaping rail sections 152 and 155 is suitably finished to form an accurate shaping surface which receives the glass sheets in contact therewith.

To provide the hinged joints between the mold center section and end sections, the opposite ends of each of the center section shaping rails 152 have an outwardly extending web member 156 (FIG. 16) provided thereon which member terminates in a longitudinally directed bar portion 157. The corresponding ends of the end section shaping rails 155 each have an outwardly directed web member 158 attached thereto which member has its outer end formed as a yoke 159 to receive therewithin the bar portion 157. Axially aligned holes are provided in both the bar portion 157 and the yoke 159 to receive therethrough a suitable pin 160 which serves to secure the mold sections in hinged relationship with one another. Although the mold center and end sections are shown hingedly connected to one another, it is only necessary that the sections be able to move a limited distance so as to properly conform to the undersurface of occasional glass sheets not accurately bent on the mold 93. Provision for movement in the mold sections is also desirable to accommodate the slight expansion of the bent sheets when again heated.

To support the mold above the rack, a transverse rod 161 is rigidly secured to the undersurface of each of the end section shaping rails 155 and has each of its opposite ends extending outwardly therefrom to be rotatably received in a link 162 swingably supported at its upper end upon a pin 163 secured to a rack upright 148. To limit the opening action of the mold sections, a pair of spaced bars 164 extend diagonally upwardly from each of the rack end rails and have their upper ends adjacent but spaced slightly outwardly from the transverse rods 161.

As a means of controlling the amount of radiant heat striking the undersurfaces of the glass sheets when supported upon the mold, a pair of shields 165 and 166 are carried by the rack 144 beneath the glass sheets. The shields 165 and 166, similarly to the shields on the molds 29 and 93, are composed of a material having a higher specific heat than glass.

As shown in FIG. 16, the shields 165 and 166 are similar in size and shape with the bottom shields 140 and 141 provided on the mold 93 and similarly have their inner longitudinal edges 167 and 168 spaced an equal distance on each side of a center line $y$—$y$ which corresponds to the line $y$—$y$ shown in FIG. 15. Thus, the shields 165 and 166 allow radiant heat from below to strike substantially the same area on the bottom surfaces of the glass sheets 61 and 62 as is allowed by the gap 142 provided between the bottom shields 140 and 141 on the mold 93. Similarly, the shields 165 and 166 withdraw heat from the furnace atmosphere adjacent the shaded areas 89 and 90 (FIG. 6) of the glass sheets and retard the heating thereof.

In reheating the sheets 61 and 62, the sheets are positioned one on top of the other upon the shaping rail and supported on the shaping surface of the mold 145. The mold is then passed into and through a furnace such as the furnace 82 shown in FIG. 20 and subjected to temperatures somewhat less than normal bending temperatures but sufficiently high to heat the glass sheets to a temperature at which any strain patterns are removed and at which the glass sheets will properly conform to the shaping surface but not sag inwardly thereof. Since the glass sheets expand somewhat upon being heated, the hingedly connected mold sections 150 and 151 move a sufficient distance to accommodate the expansion and upon the glass reaching the temperature at which the strain patterns are removed the glass is softened to the extent that the mold sections will again close and return the sheet to its exact curvature. The bottom shields being positioned in such a manner as to allow radiant heat from the bottom of the furnace to strike only the portions of the sheets having the maximum curvature, prevent other portions of the sheet from becoming heated to the extent that additional sag is produced therein. After being heated to a temperature sufficient to remove strain patterns, the glass sheets are passed into an annealing section of the furnace wherein they are slowly cooled to handling temperature. In so cooling, the marginal edge portions of the sheets, which extend outwardly from the mold shaping rail, will cool at a more rapid rate as compared to the portions immediately above said rail and thus will have compression stresses formed therein. The formation of such compressive stresses is highly desirable since it provides a strong breakage resistant ring or marginal area extending about the entire periphery of the bent sheets.

After being annealed, the pair of bent glass sheets are then ready to be laminated with a plastic interlayer therebetween and used, for example, as a windshield for an automobile.

*Summary of the method of the invention*

In order to make more clear the method of the invention, and particularly the part the various bending molds play in providing apparatus with which the various steps of the method may be performed, the overall method of bending glass sheets, according to the invention, will be briefly summarized below.

A pair of glass sheets 61 and 62, cut to the outline shown in solid lines in FIG. 6, are initially supported above the prebend mold 29 which is swung to the open position of FIG. 8 to receive the same. With the mold in the open position, the glass sheets are supported at each of their opposite ends, and also inwardly of the ends at approximately the one-quarter points of the sheets by the blocks 63. The mold 29, having the sheets to be bent supported thereon, is then passed through a bending furnace such as the furnace 82 shown in FIG. 20. In passing through the furnace, the mold is subjected to zones of increasing temperature until the glass sheets have reached bending temperature or the temperature at which they will sag due to their weight. At this temperature, the lack of rigidity in the sheet allows the opposite end sections 35 of the mold to swing upwardly. In so doing, the support blocks 63 which are connected for synchronous movement with the mold end sections begin to move downwardly although remaining in contact with the undersurface of the lower glass sheet 62. Thus, while bending, the glass sheets are constantly supported at six different points as defined by the four support blocks 63 and the two rail portions 45 of the mold end sections.

As the sheets sag downwardly toward the mold shaping surface, the end sections of the mold swing upwardly and inwardly while continuing to lower the blocks 63 in synchronous relationship therewith until the central portion of the lower sheet 62 settles into a conformity with the central portion of the mold shaping surface. At this time, the mold end sections have not completely closed and the last increment of movement necessary to effect final closing lowers the blocks 63 below the central portion of the mold shaping surface.

Due to the placement of the bottom shields 73 and 74 and the gap 77 therebetween, radiant heat striking the under surfaces of the glass sheet, from the bottom of the bending furnace, only acts upon an area defined by the relatively sharply curved end sections of the glass sheet and a longitudinal area therebetween roughly defined by the space or gap 77 between the shields. Thus, only those portions of the sheet requiring considerable bending are exposed to radiant heat from both above and below the path of the glass sheets through the bending furnace. Due to the symmetrical positioning of the shields 73 and 74 about the line $y-y$, which defines the point of maximum curvature in the concavo-convex bend about the longitudinal axis of the sheet, the sag of the sheets in the central portions thereof is controlled so as to be at a maximum in the vertical plane defined by the line $y-y$. While acting as shields per se, the shields 73 adn 74 withdraw heat from the furnace atmosphere and thus additionally retard the heating of those portions of the glass sheet which they shield from radiant heat. Also, since the shields are at a lower temperature than the glass sheets, they will absorb radiant heat emitted by the hotter glass which, of course, acts to cool those portions of the sheets in proportion to their distance from said shields.

After being initially bent upon the mold 29, the glass sheets, in cross-sectional view, have a configuration corresponding to the phantom lines in FIG. 15. After passing through the bending zone of the furnace, the sheets are then preferably cooled in an annealing zone (not shown) connected to the furnace 82.

After being cooled to a temperature whereat the sheets 61 and 62 will retain their bent shape if left unsupported, the sheets are cut to rough pattern outline and placed upon the second or substantially final bend mold 93 (FIG. 11) and again conveyed into and through a bending furnace such as the furnace 82. In passing through the furnace, the portions of the sheets requiring little bending are shaded from radiant heat by both the upper shields 128 and 129 and the lower shields 140 and 141. As was the case with the mold 29, the lower shields of the mold 93, due to their close proximity with the glass sheets, additionally retard the heating of the shaded portions of the glass sheet by withdrawing heat from the furnace atmosphere adjacent thereto. However, substantially the same portions of the sheet, i.e., the sharply curved end portions and a longitudinal central portion therebetween, are again exposed to radiant heat which passes through the shield gaps 132 and 142. Thus a longitudinal sheet area on each side of the line $y-y$, defining the portion of maximum curvature about the longitudinal axes of the sheet, receives sufficient concentrations of radiant heat to allow it to sag to the curvature shown by solid lines in FIG. 15 and in so doing, the front longitudinal edge of the sheet moves over the inclined section 99 of the shaping rail until the sheet has properly conformed to the desired curvature.

It will be understood, of course, that the passage of the bending apparatus through the furnace is carefully timed so that the glass sheets will remain therein only for a time interval sufficient to absorb enough radiant heat to sag to the required curvature. Since the movement of the sheets in sagging to the concavo-convex curvature about the longitudinal axes of the sheet may move the sharply curved end portions of the sheet out of proper conformity with the corresponding portions of the mold shaping surface, the press members 109 are caused to engage the upper surface of the glass sheets and by exerting pressure thereon cause these portions to properly conform to the mold shaping rail.

After being properly bent, the sheets are passed through a suitable annealing section (not shown) of the furnace 82 wherein they are slowly cooled to prevent, as much as possible, the formation of undesirable strain patterns. After the sheets have become cooled to a temperature sufficient to retain their bent shape if left unsupported, they are cut to final pattern outline along line $m$. The sheets, as then finally cut, are placed upon the third mold 145 (FIG. 16) and again passed into a furnace and subjected to sufficient temperatures to remove all strain patterns. The sheets are then annealed, and due to the location of the mold shaping rail inwardly from the edges thereof, the marginal area of each of the glass sheets immediately adjacent said rail cools at a slower rate due to the residual heat remaining within the rail. Thus, the peripheral edge portion of the sheet outwardly thereof cools at a faster rate and has a compression stress set therein.

After being cooled, the sheets 61 and 62 are ready to be laminated with a plastic interlayer to form, for example, a windshield.

It is to be understood that the form of the invention herewith shown and described is to be taken as a preferred embodiment of the same, and various changes may be resorted to without departing from the spirit of the invention or the scope of the subjoined claims.

We claim:

1. A method of bending a glass sheet to a complex curvature including a first concavo-convex bend about one major axis of the sheet and a second concavo-convex bend about the other major axis of the sheet, comprising the steps of heating a glass sheet to sagging temperature and bending said sheet about its transverse axis into a concavo-convex curvature and then reducing the temperature of said sheet below bending temperature, placing the bent sheet on a bending mold having a shaping surface which engages said sheet about the marginal periphery thereof, supporting and restraining one longitudinal edge of the bent sheet while supporting the other longitudinal edge for movement in a direction substantially parallel to the transverse axis thereof, reheating the sheet to bending temperature in an area including a source of radiant heat, and subjecting a longitudinal area inwardly of said movably supported edge to a radiant heat concentration sufficient to soften said area whereby the sheet sags and the movably supported edge moves downwardly to accommodate the sag.

2. A method of bending a glass sheet to a complex curvature including bends about both the transverse and longitudinal axes of said sheet, comprising heating the sheet to sagging temperature and bending the marginal edge portion of said sheet into conformity with the shaping surface of a concavely curved mold, and after the sheet contacts the mold shaping surface retarding the heating of a sheet portion spaced inwardly of one of the longitudinal edges of the sheet, and concentrating radiant heat on a longitudinally extending area of the sheet between the sheet area having the heating thereof retarded and the one longitudinal sheet edge while continuing to heat said sheet to cause the sheet to sag downwardly inwardly of the marginal edge portions thereof.

3. A method of bending a hot glass sheet within a furnace and bent about its transverse axis to a concavo-convex curvature to form a concavo-convex bend about the longitudinal axis of said sheet, comprising engaging the undersurface of the hot sheet with a curved shaping surface which contacts said sheet about substantially the entire marginal periphery thereof which shaping surface includes spaced longitudinal portions for engaging the longitudinal marginal areas of the sheet, concentrating radiant heat upon a longitudinal area of the sheet while the sheet is engaged by the shaping surface inwardly of the longitudinal edges thereof and closer to one of said longitudinal marginal sheet areas than to the other longitudinal marginal area to sag the sheet downwardly and bend the sheet about the longitudinal sheet axis, and maintaining the maximum depth of bend in the sheet in the area receiving the radiant heat concentration by withdrawing heat from the furnace atmosphere adjacent a surface of the sheet in an area thereof between the sheet area receiving the concentrated heat and a longitudinal marginal area of the sheet.

4. A method of bending a hot glass sheet as defined in claim 3, wherein radiant heat is directed toward the entire surface of the sheet, and radiant heat is concentrated upon the longitudinal sheet area by shielding sheet areas on each side of said longitudinal area from radiant heat.

5. A method of further bending a hot glass sheet which is bent about its transverse axis to form a bend therein about the longitudinal axis thereof, comprising maintaining the sheet in a heated atmosphere while engaging the undersurface of the bent sheet with a shaping rail including a pair of spaced longitudinal rail portions for engaging the longitudinal marginal edges of the bent glass sheet the first of which rail portions having its glass engaging surface disposed at a downwardly inclined angle to the horizontal and the other of which rail portions having an opposite portion disposed substantially parallel to the undersurface of the bent sheet and of a relatively narrower width, and concentrating heat upon a longitudinal area of the sheet between said spaced rail portions to cause the sheet to bend about the longitudinal axis and sag between said rail portions whereby the sheet portion engaged by said first rail portion slides thereover to accommodate the sag.

6. A method of bending a glass sheet about the longitudinal axis thereof, comprising moving the sheet transversely through a furnace while engaging the marginal periphery of the sheet with the upper surface of a shaping rail, directing radiant heat at the sheet to heat said sheet, concentrating radiant heat upon a longitudinal area of the sheet spaced inwardly from the longitudinal marginal edges of said sheet to sag said longitudinal area below the upper surface of said shaping rail, and controlling the sag by withdrawing heat from the furnace atmosphere adjacent a surface of the sheet in an area adjacent said longitudinal sheet area.

7. A method of bending a glass sheet about both the longitudinal and transverse axes thereof, comprising supporting the sheet in a furnace above the shaping surface of a concave mold while directing radiant heat at substantially the entire upper surface of the sheet to heat said sheet to bending temperature and bend the sheet about its transverse axis into contact with the mold, concentrating radiant heat upon a longitudinal area of the lower surface of the sheet to heat said area to a higher temperature than an adjacent longitudinal sheet area whereby said area receiving the concentrated heat bends about the longitudinal axis of the sheet, and withdrawing heat from the furnace atmosphere adjacent the lower surface of the sheet to control the depth of bend about the longitudinal sheet axis.

8. In a method of bending a glass sheet to a complex curvature including bends about the major axes of said sheet, the steps of supporting the sheet on a mold having a rail shaping surface into conformity with which the marginal undersurface of the sheet is to be bent, moving the mold into and through a bending furnace maintained at elevated temperatures and directing radiant heat at the sheet to heat said sheet to bending temperature while the mold is within said bending furnace, retarding the heating of the glass sheet over an area spaced inwardly of the opposite ends thereof and inwardly of one of the side edges thereof by withdrawing heat from the furnace atmosphere adjacent that area of the sheet, when the sheet portions not having the heating thereof retarded are at bending temperature sagging the sheet about its transverse axis into contact with the mold shaping surface, and after the sheet contacts the mold shaping surface continuing to direct radiant heat at the sheet while continuing to retard the heating of said area of the sheet whereby the sheet sags about the longitudinal axis inwardly of the side edges thereof.

(References on following page)

References Cited

UNITED STATES PATENTS

| | | | |
|---|---|---|---|
| 1,944,160 | 1/1934 | Barker | 296—84 |
| 2,233,708 | 3/1941 | Norton | 296—84 |
| 2,348,278 | 5/1944 | Boyles et al. | 65—288 |
| 2,377,849 | 6/1945 | Binkert et al. | 65—103 |
| 2,450,297 | 9/1948 | Pearse et al. | 65—103 |
| 2,452,488 | 10/1948 | Paddock et al. | 65—103 |
| 2,486,153 | 10/1949 | Gwyn | 65—24 |
| 2,551,606 | 5/1951 | Jendrisak | 65—107 |
| 2,551,607 | 5/1951 | Jendrisak | 65—291 |
| 2,646,647 | 7/1953 | Bamford et al. | 65—103 |
| 2,691,854 | 10/1954 | Rugg | 65—26 |
| 2,720,729 | 10/1955 | Rugg | 65—288 |

FOREIGN PATENTS

| | | |
|---|---|---|
| 128,357 | 7/1948 | Australia. |
| 1,097,088 | 12/1954 | France. |

DONALL H. SYLVESTER, *Primary Examiner.*

MAURICE V. BRINDISI, CHARLES R. HODGES, BENJAMIN BENDETT, IVAN R. LADY, ARTHUR P. KENT, MORRIS O. WOLK, *Examiners.*

T. JONES, F. W. MIGA, *Assistant Examiners.*